United States Patent [19]

Lassberg

[11] Patent Number: 5,771,598
[45] Date of Patent: Jun. 30, 1998

[54] MEASUREMENT DEVICE WITH BRITISH/METRIC SCALES

[76] Inventor: Hilmar J. Lassberg, 13164 Memorial Dr., Suite 102, Houston, Tex. 77079-7220

[21] Appl. No.: 618,025

[22] Filed: Mar. 25, 1996

[51] Int. Cl.⁶ .................................................. B43L 7/00
[52] U.S. Cl. ........................................ 33/494; 33/492
[58] Field of Search ............................. 33/494, 455, 456, 33/484, 485, 491, 492, 679.1, 486, 11

[56] References Cited

U.S. PATENT DOCUMENTS

| 1,528,992 | 3/1925 | Rose | 33/494 |
| 2,459,554 | 1/1949 | Tomko | 33/494 |
| 3,837,569 | 9/1974 | Bradbury et al. | 116/DIG. 47 |

FOREIGN PATENT DOCUMENTS

| 474890 | 7/1951 | Canada | 33/492 |
| 852520 | 6/1939 | France | 33/494 |
| 840206 | 5/1952 | Germany | 33/492 |
| 37066 | 11/1912 | Sweden | 33/486 |
| 62890 | 12/1912 | Switzerland | 33/494 |
| 150464 | 9/1920 | United Kingdom | 33/494 |

*Primary Examiner*—G. Bradley Bennett
*Attorney, Agent, or Firm*—Harrison & Egbert

[57] ABSTRACT

A measurement device including a generally flat member having a first edge extending therealong, a first set of British scale graduations formed along the first edge and extending inwardly of the first edge for a desired distance, and a first set of metric scale graduations formed adjacent the first set of British scale graduations and spaced in parallel relationship from the first edge of the generally flat member by approximately the length of the desired distance that the first set of British scale graduations extends inwardly. The first set of British scale graduations has numerical designations arranged in a first orientation. The first set of metric scale graduations has numerical designations arranged in a similar orientation as the numerical designations of the first set of British scale graduations.

20 Claims, 7 Drawing Sheets

MEASUREMENT DEVICE WITH BRITISH/METRIC SCALES

TECHNICAL FIELD

The present invention relates to devices for measuring distance. More particularly, the present invention relates to rulers that are capable of measuring distance in accordance with a British scale and in accordance with a metric scale.

BACKGROUND ART

Rulers are commonly used for the measurement of distance. Typically, on such rulers, one straight edge of the ruler includes British scale markings while the other second edge of the ruler includes metric markings. The British scale markings are typically conveyed in inch measurements. Each of the inch measurements is subdivided into halves, quarters, eighths, and sixteenths. Typically, these measurements extend along the entire edge of the ruler. On the opposite edge of the ruler, the metric measurements are conveyed in centimeters. Each of the centimeter markings is subdivided into halves and into millimeter markings. On the British scale, each of the inch measurements is typically provided with a numerical designations pertaining to the number of inches from which the inch marker is found from the end of the ruler. For example, the numeral "6" will appear on the British scale when the inch marker on the ruler is six inches from the end of the ruler or from the zero inch marker. Each of these numerical designations will extend upright such that the top of the numerical designation is adjacent to the closest edge of the ruler. On the metric (centimeter) side of the ruler are a large number of numerical designations pertaining to the number of centimeters from which the marker is located from an end of the ruler. Each of the numerical designations on the metric scale of the ruler will be upright such that the top of the numerical designation is adjacent to the metric edge of the ruler.

Unfortunately, this arrangement of the British and metric scales on the ruler does not convey information in a convenient and efficient way as to the respective correlation between the British and metric scales on the ruler. Often, the ruler must be manipulated in an odd way so that a metric measurement can be taken of the same distance as was taken with the British scale. Because of the orientation of the numerical designations, the measurements should be subtracted from one another so as to arrive at a correlative distance. This can be confusing and, many times, erroneous. Because of the opposite orientations of the respective British and metric scales on the ruler, it is very difficult for a user of the ruler to have a clear mental impression of the relationship between the British scale and the metric scale.

In the past, various patents have issued relating to devices for carrying out British and metric measurements. For example, U.S. Pat. No. 1,528,992, issued on Mar. 10, 1925, to M. F. Rose teaches a typewriter scale in which a British measurement scale is incorporated along one edge of the typewriter scale. A typewriter scale of measurement is provided along the opposite side of the scale. There is no common orientation between the position of the metric scale and the position of the British scale.

U.S. Pat. No. 3,837,569, issued on Sep. 24, 1974, to Bradbury et al. teaches a metric conversion ruler for converting British units to metric units and vice versa. This device includes a pair of spaced, rigidly affixed members each provided with a two-cycle logarithmic scale and a slide plate disposed therebetween in a tight, slidable relationship. The slide plate is provided with a plurality of conversion indicia on each side thereof. Each conversion indicia includes a pair of spaced arrows pointing either toward one or the other of the pair of members with the distance between the pair of arrows representing a specific conversion factor which is determined by the distance between numeral "1" on the logarithmic scale and the numeral corresponding to the conversion factor.

British Patent No. 150,464 teaches an improved ruler and paper knife having a graduated and bevelled or safety edge so that ink lines may be drawn without blotting the paper. The graduated edge may, when desired, be applied close to the paper so that lengths may be measured accurately. In this ruler, a British scale is provided along one edge of the ruler. Another scale is provided along the opposite side of the ruler without orientation to the British scale.

British Patent No. 831,453, published on Mar. 30, 1960, describes an evaluating device in the form of a ruler. On this ruler, a metric scale is provided along one edge of the ruler and a British scale is provided on the opposite side of the ruler.

Various U.S. design patents have been issued relating to ruler designs. Design U.S. Pat. No. 158,145, issued on Apr. 11, 1950, to G. J. Staab teaches a ruler of a conventional configuration having a metric scale along one edge and a British scale along an opposite edge with inverted orientation of numerical designations. Design U.S. Pat. No. 255,784, issued on Jul. 8, 1980, to D. D. Seely, Jr., teaches a multiple scale ruler having common British scale measurements along each of the sides of the ruler. Design U.S. Pat. No. 257,962, issued on Jan. 20, 1981, to Youdelman et al. teaches a measuring device in the form of a height scale. A metric measurement is provided along one edge of the ruler and an inch measurement is provided on the opposite edge of the ruler. Design U.S. Pat. No. 348,897, issued on Jul. 19, 1994, to M. A. Vedol describes a clip-on calculator which includes a metric scale along one edge of the calculator and in inch scale on the opposite edge of the calculator. Each of these prior art U.S. design patents describes measuring implements with the problems described in conjunction with the prior art.

It is an object of the present invention to provide a measurement device which allows for proper cross-measurement between British scale measurements and metric scale measurements.

It is another object of the present invention to provide a measurement device in which accurate British or metric measurements can be taken regardless of the initial orientation of the ruler.

It is a further object of the present invention to provide a measurement device that facilitates the understanding of the relationship between metric and British measurements.

It is still another object of the present invention to provide a measurement device which is easy to use, easy to manufacture, and relatively inexpensive, These and other objects and advantages of the present invention will become apparent from a reading of the attached specification and appended claims.

SUMMARY OF THE INVENTION

The present invention is a measurement device that comprises a generally flat member having a first edge extending therealong, a first set of British scale graduations formed along the first edge and extending inwardly of the first edge for a desired distance and a first set of metric scale graduations formed adjacent to the first set of British scale graduations and spaced in parallel relationship from the first edge by approximately the distance in which the British scale designations extend from the first edge. The first set of British scale graduations has numerical designations arranged in a first orientation. The first set of metric scale graduations has numerical designations arranged in a similar orientation as the numerical designations of the first set of British scale graduations.

The generally flat member also has a second edge extending in parallel relationship to the first edge. The measurement device further includes a second set of metric scale graduations formed along the second edge and extending inwardly of the second edge for a given distance and a second set of British scale graduations formed adjacent to the second set of metric scale graduations and spaced in parallel relationship from the second edge by approximately the given distance. The second set of metric scale graduations has numerical designations arranged in a second orientation. The second set of British scale graduations has numerical designations arranged in a similar orientation as the numerical designations of the second set of metric scale graduations. The numerical designations of the second set of British scale graduations are upside down relative to the numerical designations of the first set of British scale graduations. Similarly, the numerical designations of the second set of metric scale graduations are upside down relative to the numerical designations of the first set of metric scale graduations.

The generally flat member has a middle between the first and second edges. Both of the numerical designations of the second set of metric scale graduations and the second set of British scale graduations are on opposite sides of the middle from the numerical designations of the first set of metric scale graduations and the first set of British scale graduations. Each of the first set of British scale graduations and the first set of metric scale graduations starts from a common zero point. Similarly, each of the second set of metric scale graduations and the second set of British scale graduations starts from a similar zero point at an opposite end of the measurement device.

In an alternative embodiment of the present invention, the measurement device includes a generally flat member having a first edge extending therealong, a first set of metric scale graduations formed along the first edge and extending inwardly of the first edge for a desired distance, and a first set of British scale graduations formed adjacent to the first set of metric scale graduations and spaced in parallel relationship from the first edge by the desired distance. The first set of British scale graduations have numerical designations arranged in a similar orientation as the numerical designations of the first set of metric scale graduations. In this alternative embodiment, an indicator line extends from the numerical designations of the first set of British scale graduations transversely toward the first edge. Additionally, a second set of metric scale graduations is formed adjacent to the first set of British scale graduations opposite the first set of metric scale graduations. The second set of metric scale graduations has numerical designations of a similar orientation as the numerical designations of the first set of British scale graduations. In this embodiment, the second set of metric scale graduations is a weight measurement scale.

In a further embodiment of the present invention, the generally flat member is formed of a bottom panel resiliently mounted to a top panel. The first set of metric scale graduations and the first set of British scale graduations are formed on the top panel. The generally flat member further comprises a plurality of insert elements each having a bulbous portion at one edge and a hinge member at an opposite edge and a receptacle formed along the second edge between the top and bottom panels. The receptacle receives the hinge member of the plurality of insert elements such that the bulbous portion extends outwardly of the second edge. The bulbous portion has a hole formed generally centrally therein. In this embodiment, the hinge member includes a longitudinal rod extending through the receptacle. Each of the plurality of insert elements is connected to the longitudinal rod.

In another alternative embodiment of the present invention, the measurement device further comprises a connector member extending along a second edge of the generally flat member opposite the first edge, an intermediate connector having a first receptacle detachably receiving the connector member, and an insert element having a hinge member which is detachably received by a second receptacle formed in the intermediate connector. The insert element includes a bulbous portion at one end and the hinge member at the opposite end.

In still a further alternative embodiment of the present invention, the measurement device includes a plurality of insert elements which are hingedly connected to a second edge of the generally flat member opposite the first edge. Each of the plurality of insert elements has a bulbous portion opposite to the second edge. The bulbous portion has a hole formed generally centrally therein.

DETAILED DESCRIPTION OF THE INVENTION

Figure 1:
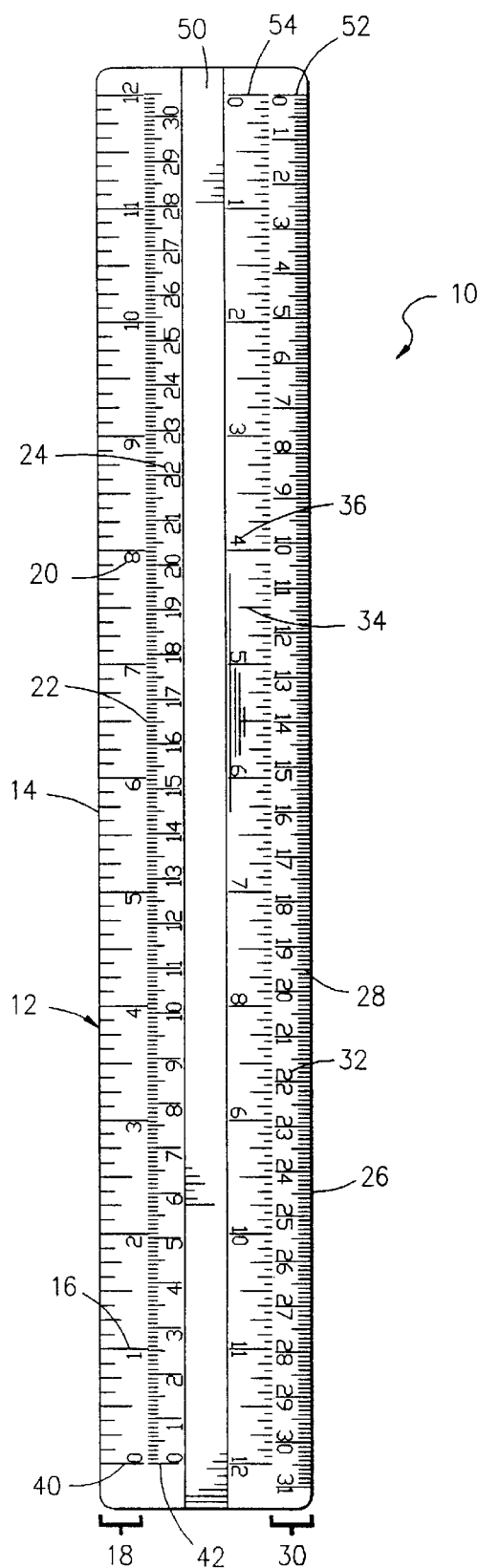
FIG. 1 is a plan view of the measurement device in accordance with the teachings of the present invention.

Referring to FIG. 1, there is shown at 10 the measurement device in accordance with the first embodiment of the present invention. The measurement device 10 includes a generally flat member 12 having a first edge 14 extending therealong. A first set of British scale graduations 16 is formed along the first edge 14 and extends inwardly of the first edge for a desired distance 18. The first set of British scale graduations has numerical designations 20 arranged in a first orientation.

In the measurement device 10, a first set of metric scale graduations 22 is formed adjacent to the first set of British scale graduations 16 and spaced from the first edge 14 by the desired distance 18. The first set of metric scale graduations 22 has numerical designations 24 arranged in a similar orientation as the numerical designations 20 of the first set of British scale graduations 16.

In FIG. 1, it can be seen that a second edge 26 extends in parallel relationship to the first edge 14. It can be seen that there is a second set of metric scale graduations 28 formed adjacent to the second edge 26 and extending inwardly of the second edge for a given distance 30. The second set of metric scale graduations 28 has numerical designations 32 arranged in a second orientation. A second set of British scale graduations 34 is formed adjacent to the second set of metric scale graduations 28 and are spaced in parallel relationship from the second edge 26 by approximately the given distance 30. The second set of British scale graduations 34 has numerical designations 36 arranged in a similar orientation as the numerical designations 32 of the second set of metric scale graduations 28.

In FIG. 1, the British scale graduations 16 are the inch measurements extending along the length of the measurement device 10. Initially, it can be seen that the inch measurements of the British scale 16 are subdivided into sixteenths of an inch. The numerical designations 20 are provided at each inch marker of the British scale 16. The British scale 16 begins at a zero inch marker 40 adjacent to one end of the measurement device 10. The metric scale 22 is subdivided into millimeter measurements. The metric scale 22 includes numerical designations 24 at each centimeter marking along the length of the metric scale 22. The metric scale 22 begins with a zero centimeter marking 42 at one end of the measurement device 10. As can be seen, the zero centimeter marking 42 aligns with the zero inch marking 40. As such, the British scale 16 is properly aligned and is in corresponding orientation with the metric scale 22. As a result, each inch designation along the length of the British scale 16 should correspond with a proper centimeter/ millimeter measurement of the metric scale 22. As a result, any person desiring to measure a distance along the British scale 16 will be able to easily locate the approximate metric measurement for the same distance. Since each of the numerical designations 20 of the British scale 16 are orientated in the same direction as the numerical designations 24 of the metric scale 22, it is extremely easy to determine the relative distance measurements along either of the British scale 16 or the metric scale 22.

In FIG. 1, the second set of metric scale graduations 28 and the second set of British scale graduations 34 are positioned on an opposite side of the measurement device 10 from that of the first set of British scale graduations 16 and the first set of metric scale graduations 22. In particular, a middle area 50 is formed between the first set of British and metric scale graduations and the second sets of metric and British scale graduations. As such, the measurement device 10 includes two scales oriented toward each of the sides 14 and 26 of the measurement device 10.

The second set of metric scale graduations 28 extends along the edge 26 of the measurement device 10. The second set of metric scale graduations 28 begins with a zero centimeter marker 52 at one end of the measurement device 10. Similarly, the second set of British scale graduations 34 begins with a zero inch marker 54 at one end of the measurement device 10. The alignment of the zero centimeter marker 52 with the zero inch marker 54 assures that each of the scales 28 and 34 are orientated properly with one another. It can also be seen that the numerical designations 32 of the metric scale 28 are orientated in the same direction as the numerical designations 36 of the inch scale 34. As such, it is very easy to determine the proper relationship between the inch measurement and the metric measurement when the edge 26 is used for measurement. As can be seen in FIG. 1, the second set of metric scale graduations 28 has numerical designations 32 that are upside down relative to the numerical designations 24 of the first set of metric graduations 22. Similarly, the second set of British scale graduations 34 has numerical designations 36 which are upside down relative to the numerical designations 20 of the first set of British scale graduations 16.

As shown in FIG. 1, the measurement device 10 is in the form of a ruler. As such, the flat member 12 is a linear member having linear edges 14 and 26. However, it should be noted that, with the concept of the present invention, the measurement device 10 and the flat member 12 could also be a protractor, a tape measure, a triangle, and similar devices. The illustration of the flat member 12 as a ruler is merely showing the preferred embodiment of the present invention.

Figure 2:
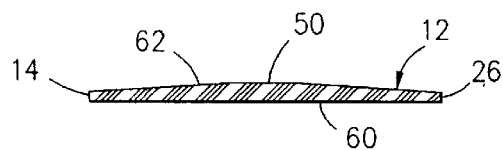
FIG. 2 is a cross-sectional view of the measurement device in accordance with the teachings of the present invention.

Referring to FIG. 2, there is shown a cross-sectional view of the flat member 12 of the present invention. Initially, it can be seen that the flat member 12 has a flat bottom surface 60 and raised surfaces 62 and 64 extending upwardly from the flat bottom surface 60. The raised surface 62 tapers downwardly so as to narrow along edge 14. Similarly, the raised area 64 tapers downwardly toward the edge 26 so as to narrow at edge 26. The first set of British scale graduations 16 and the first set of metric scale graduations 22 are placed along the raised area 62 of flat member 12. The second set of metric scale graduations 28 and the second set of British scale graduations 34 are positioned on the raised area 64 of the flat member 12. The middle 50 is formed in the area between the raised portions 62 and 64. The cross-sectional configuration of the flat member 12, as shown in FIG. 2, is merely illustrative of the preferred embodiment of the present invention. Various other configurations of the structure of the present invention are possible within the scope of the present invention.

Figures 3A, 3B:
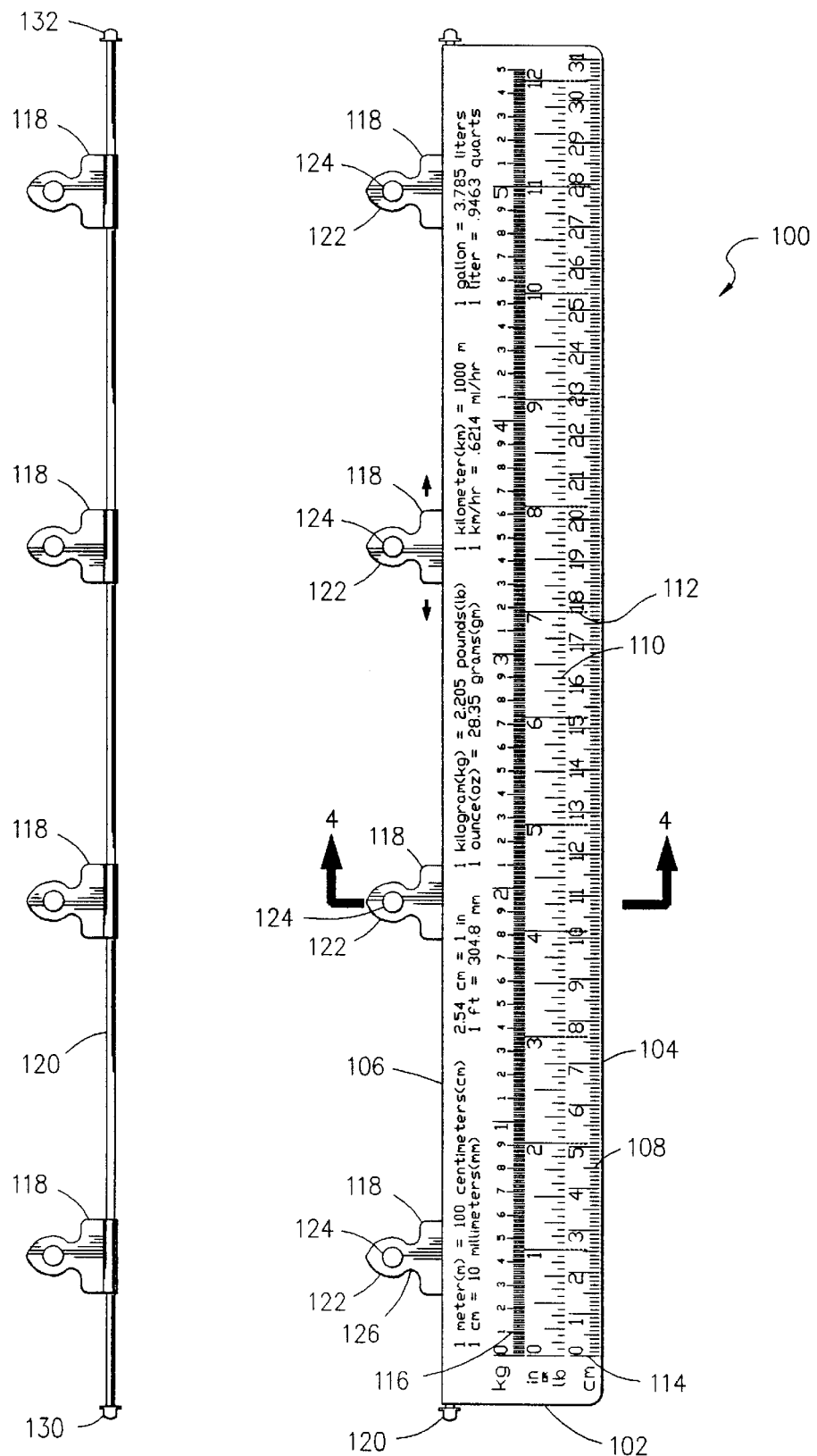
FIG. 3A is a plan view of a first alternative embodiment of the measurement device of the present invention.
FIG. 3B is an isolated view of the plurality of insert elements, the hinge member, and the longitudinal rod which are received in the second edge of the measurement device of FIG. 3A.

Referring to FIG. 3A, there is shown at 100 an alternative embodiment of the measurement device of the present invention. The alternative embodiment 100 includes a generally flat member 102 having a first edge 104 and a second edge 106. A first set of metric scale graduations 108 is formed along the first edge 104. A first set of British scale graduations 110 is spaced from the first edge 104 and positioned behind the first set of metric scale graduations 108. Each of the first set of metric scale graduations 108 and the first set of British scale graduations 110 includes numerical designations at appropriate locations. It can be seen that an indicator line 112 extends from the numerical designations of the first set of British scale graduations transversely toward the first edge 104. In particular, the indicator line 112 is a dotted line that extends toward the first edge 104 so as to provide guidance to the user of the measurement device 100 as to the proper relationship of inch measurements with the centimeter measurements. The first set of metric scale graduations 108 and the first set of British scale graduations 110 begins with a common zero point 114.

A second set of metric scale graduations 116 is positioned on a side of the first set of British scale graduations 100 opposite to the metric scale graduations 108. The second set of metric scale graduations 116 is a weight measurement scale. The relationship of kilograms to pounds can be seen in the relationship of the first set of British scale graduations 110 and the second set of metric scale graduations 116. The numerical designations of the first set of metric scale graduations 108, the first set of British scale graduations 110 and the second set of metric scale graduations 116 are oriented in the same direction, generally right side up relative to the first edge 104.

Importantly, in FIG. 3A, it can be seen that insert elements 118 extend outwardly from the second edge 106. Each of the insert elements 118 is hingedly connected to the second edge 106 through the use of a longitudinal rod 120. Each of the insert elements 118 includes a bulbous portion 122 having a hole 124 formed therein. The hole 124 should have the size suitable for extending around the rings of a ring notebook. The bulbous portion 122 should have a size greater than the space between adjacent spirals on a spiral notebook. In normal use, the bulbous portion 122 can be inserted between adjacent spirals such that the spirals will reside in a shouldered area 126. As a result, the measurement device 100 is suitable for positioning within either a ring notebook or a spiral notebook. The hinged relationship of the insert elements 118 and the second edge 106 of the measurement device 100 facilitates the ability for the ring or spiral notebook to receive the measurement device 100.

FIG. 3B shows that the insert elements 118 are affixed around the longitudinal rod 120. Each of the insert elements 118 will extend outwardly from the longitudinal rod 120. The insert elements 118 can either be affixed to the outer diameter of the longitudinal rod 120 or can be freely connected thereto. The ends 130 and 132 of the longitudinal rod 120 will extend outwardly from the edges of the measurement device 100.

Figure 4:
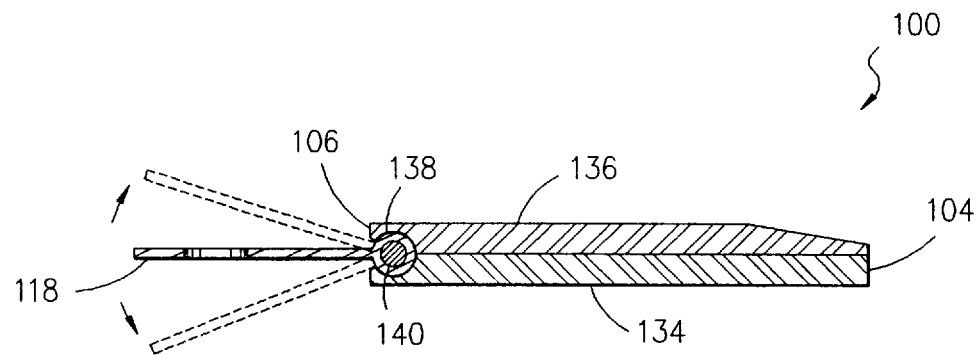
FIGS. 4–6 are cross-sectional view taken across lines 4—4 of FIG. 3A showing the manner in which the measurement device is connected to the insert elements.
Figure 5:
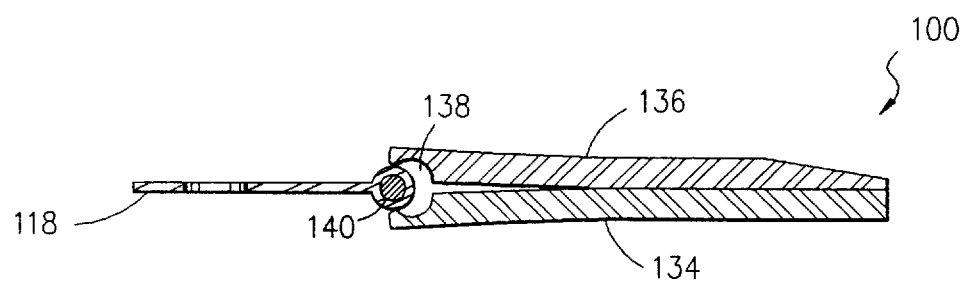
Figure 6:
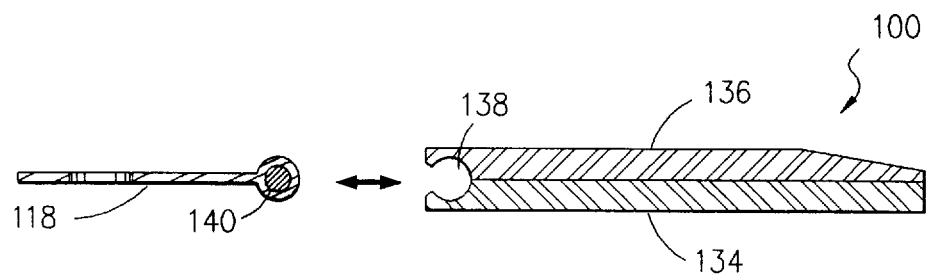

FIGS. 4–6 show the manner in which the measurement device 100 can receive the insert elements 118. In particular, it can be seen that the measurement device 100 includes a bottom panel 134 and a top panel 136. The bottom panel 134 is resiliently connected to the top panel 136 so that a slight separation of the respective panels can occur. The sets of metric and British scale graduations are formed on the top surface of the top panel 136. A receptacle 138 is formed at the second edge 106 of the measurement device 100. The receptacle 138 is formed between the top panel 136 and the bottom panel 134. The receptacle 138 has a generally circular configuration suitable for receiving the circular configuration of the hinge member 140 of the insert element 118. As can be seen in FIG. 4, the insert element 118 can pivot upwardly and downwardly relative to the motion of the hinge element 140 within the receptacle 138.

In FIG. 5, it can be seen how the measurement device 100 can be removed from the insert element 118. In particular, by pulling on the panels 134 and 136 of the measurement device 100, the hinge member 140 will separate from the receptacle 138. Because of the resilient mounted relationship between the bottom panel 134 and the top panel 136, the panels will slightly separate so as to facilitate the ability of the hinge member 140 to separate from the receptacle 138. As can be seen in FIG. 6, the insert element 118 can be pulled completely from the receptacle 138 so that the measurement device 100 can be removed easily from the interior of a spiral or ring notebook. The separation of the bottom panel 138 from the top panel 136 will return to its original position once the hinge element 140 is removed from the receptacle 138.

Figure 7B:
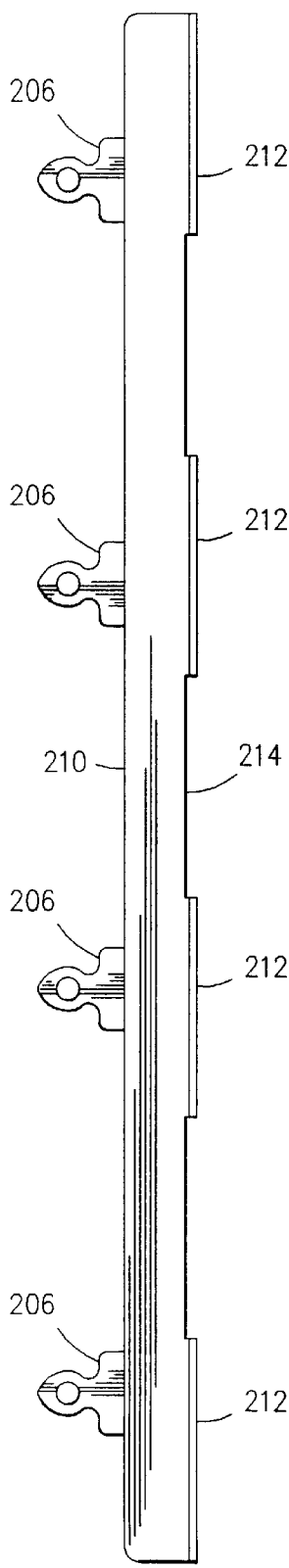
FIG. 7B is an isolated view of the intermediate member, the hinge elements, and the insert elements of the alternative embodiment of FIG. 7A.
Figure 7A:
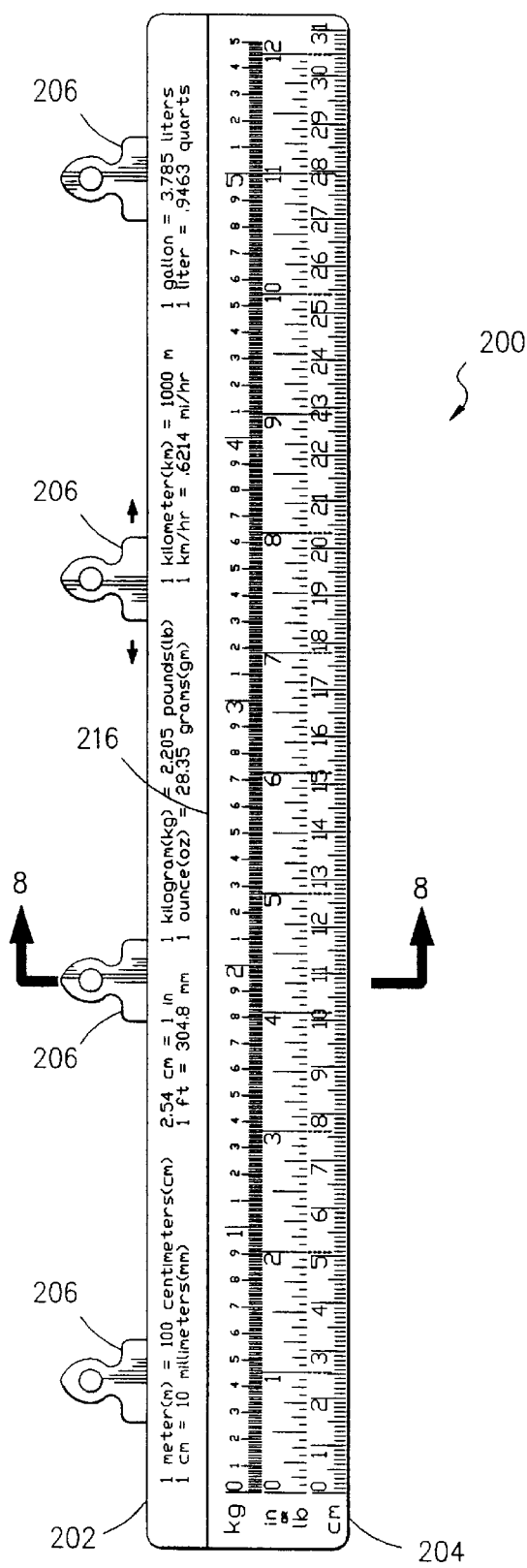
FIG. 7A is a plan view of a second alternative embodiment of the present invention.

FIG. 7 shows a second alternative embodiment 200 of the measurement device of the present invention. As can be seen in FIG. 7A, the measurement device 200 has a virtually identical configuration to that of the measurement device 100 of FIG. 3A. Importantly, however, an intermediate section 202 is connected to the flat member 204 of the measurement device 200. The insert elements 206 are detachably received within the intermediate section 202. FIG. 7B shows the arrangement of this intermediate section 202 as formed. Initially, the insert elements 206 are hingedly connected to the edge 210 of the intermediate section 202. Additionally, receptacles 212 are connected to the edge 214 of the intermediate section 202. The receptacles 212 will be connected to the rest of the members formed on the edge 216 of the measurement device 200.

Figure 8:
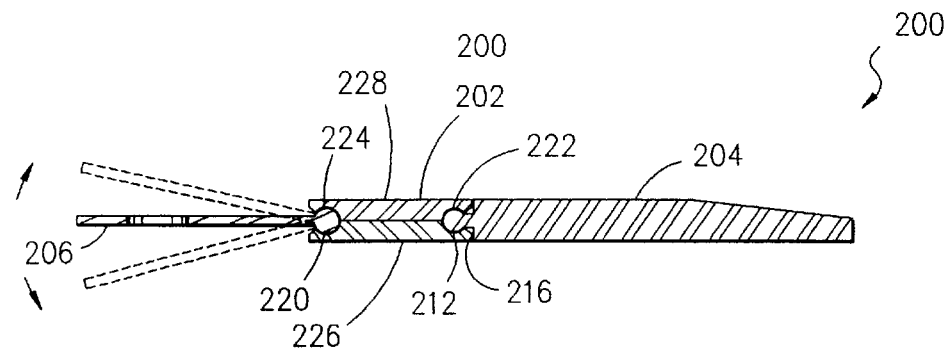
FIGS. 8–10 are cross-sectional views taken across lines 8—8 of FIG. 7A showing the manner in which the intermediate section is connected to the hinge element and to the measurement device.
Figure 9:
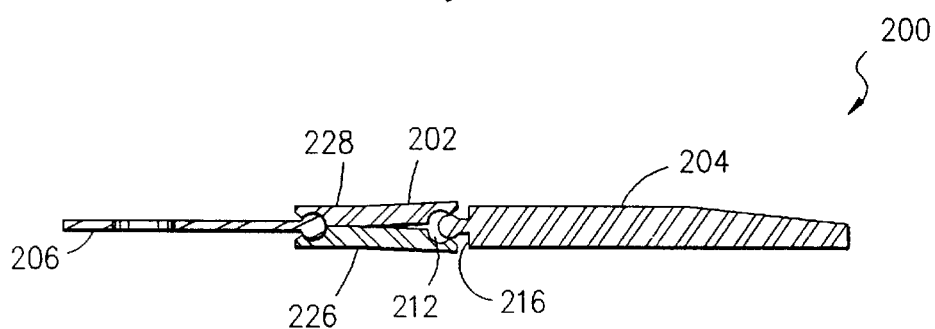
Figure 10:
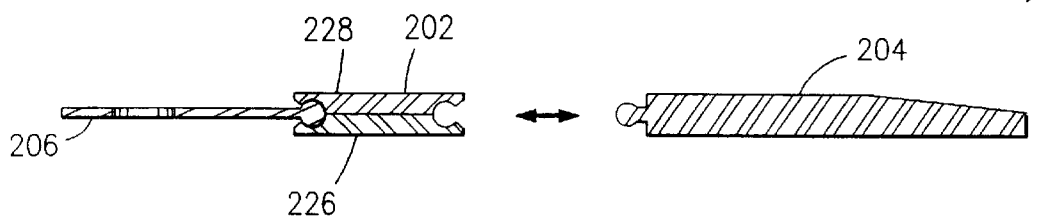

FIGS. 8–10 show the manner in which the intermediate section 202 is connected to the flat member 204 of the measurement device 200 and also shows how the intermediate section 202 is connected to the insert element 206. Initially, it can be seen that the intermediate section 202 has a first receptacle 212 and a second receptacle 220. The first receptacle 212 is removably affixed around a connector member 222 on the second edge 216 of the flat member 204 of measurement device 200. The second receptacle 220 is detachably connected to the hinge element 224 of the insert element 206. The intermediate section 202 includes a bottom panel 226 and a top panel 228. The panels 226 and 228 are resiliently connected together so as to slightly separate upon receipt of proper forces. FIG. 9 illustrates the manner in which the top panel 228 will separate from the bottom panel 226 so as to free the first receptacle 212 from the connector member 216. As such, the measurement device 200 can be removed from the intermediate section 202 and from the interior of a notebook. The insert element 206 extends outwardly from the intermediate section 202.

FIG. 10 shows how the top panel 228 will rejoin the bottom panel 226 when a complete separation occurs between the flat member 204 of the measurement device 200 and the intermediate section 202.

Figure 11:
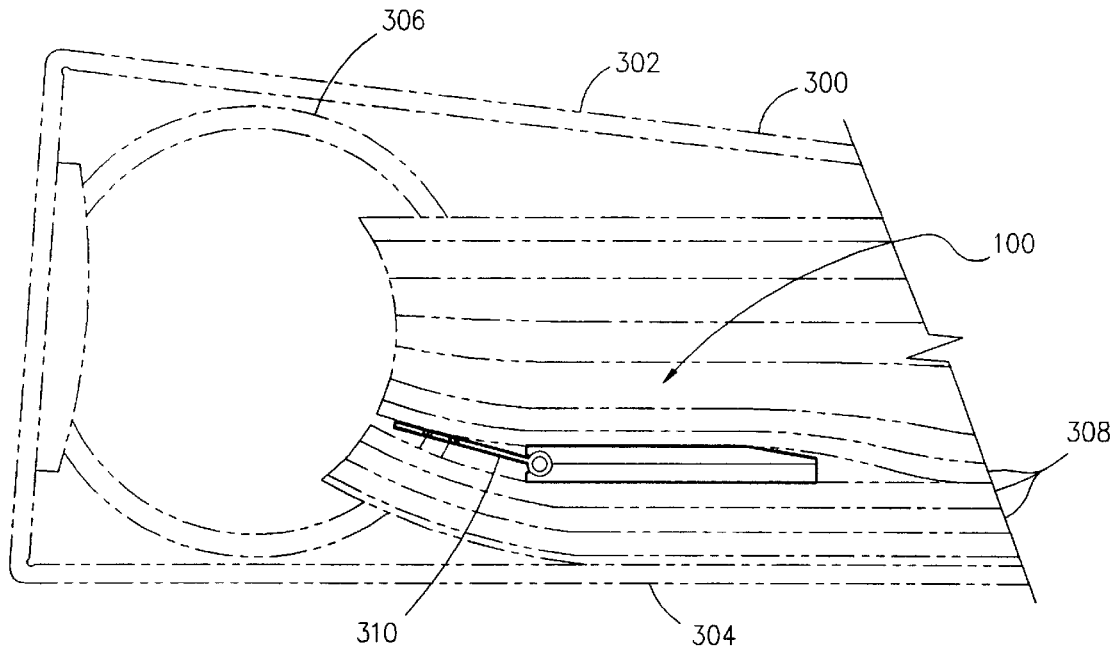
FIG. 11 is a cross-sectional view showing the manner in which the alternative embodiments of the present invention can be received within a ring notebook.

FIG. 11 shows how the alternative embodiment of the measurement device 100 is retained within a ring notebook 300. The ring notebook 300 includes a top cover 302, a bottom cover 304, a ring 306 and a plurality of pages 308. It can be seen that the insert element 310 of the measurement device 100 extends around the ring 306 of the ring notebook 300. As stated previously, the hole 124 of the insert element 310 will extend around the ring 306. The measurement device 100 is shown as juxtaposed between the pages 308 on the interior of the ring notebook 300. The hinged relationship between the insert element 310 and the measurement device 100 allows the measurement device 100 to properly adapt to the configuration of pages on the interior of the ring notebook 300.

Figure 12:
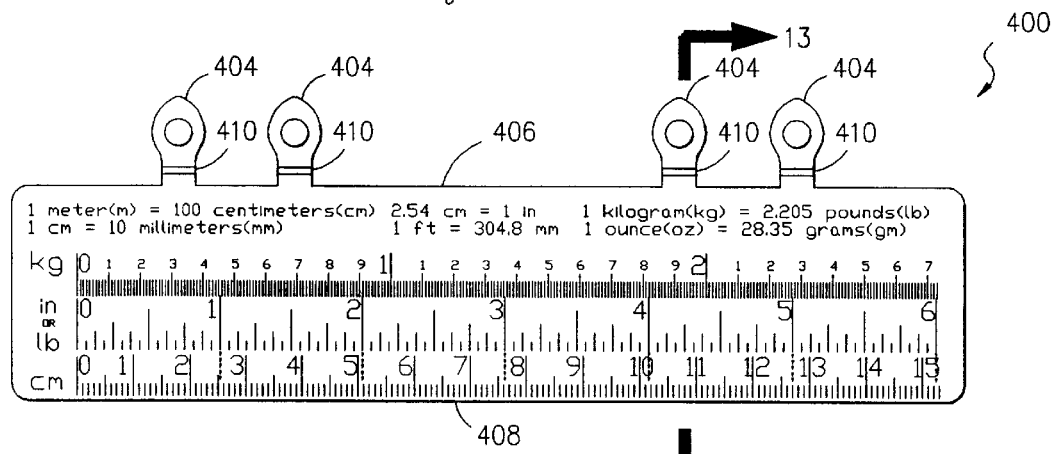
FIG. 12 is a plan view of a third alternative embodiment of the present invention.

FIG. 12 shows a third alternative embodiment 400 of the measurement device of the present invention. The sets of scales shown on the flat member 402 of the measurement device 400 have a configuration similar to that of the previous embodiments of the present invention. In the measurement device 400, the insert elements 404 are directly hingedly connected to the second edge 406 of the flat member 402. The first edge 408 is opposite the second edge 406 in parallel relationship thereto. Each of the insert elements 404 is permanently attached to the second edge 406 through the use of a "living" hinge 410. As such, each of the insert elements 404 can be integrally formed with the flat member 402 of the measurement device 400.

Figure 13:
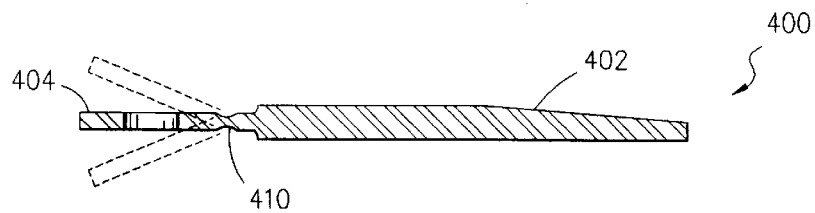
FIG. 13 is a cross-sectional view of the alternative embodiment of FIG. 12 taken across lines 13—13.

FIG. 13 shows how the insert element 404 can properly flex relative to the hinge 410. As such, the measurement device 400 can be adequately received within the interior of a ring or spiral notebook.

Figure 14:
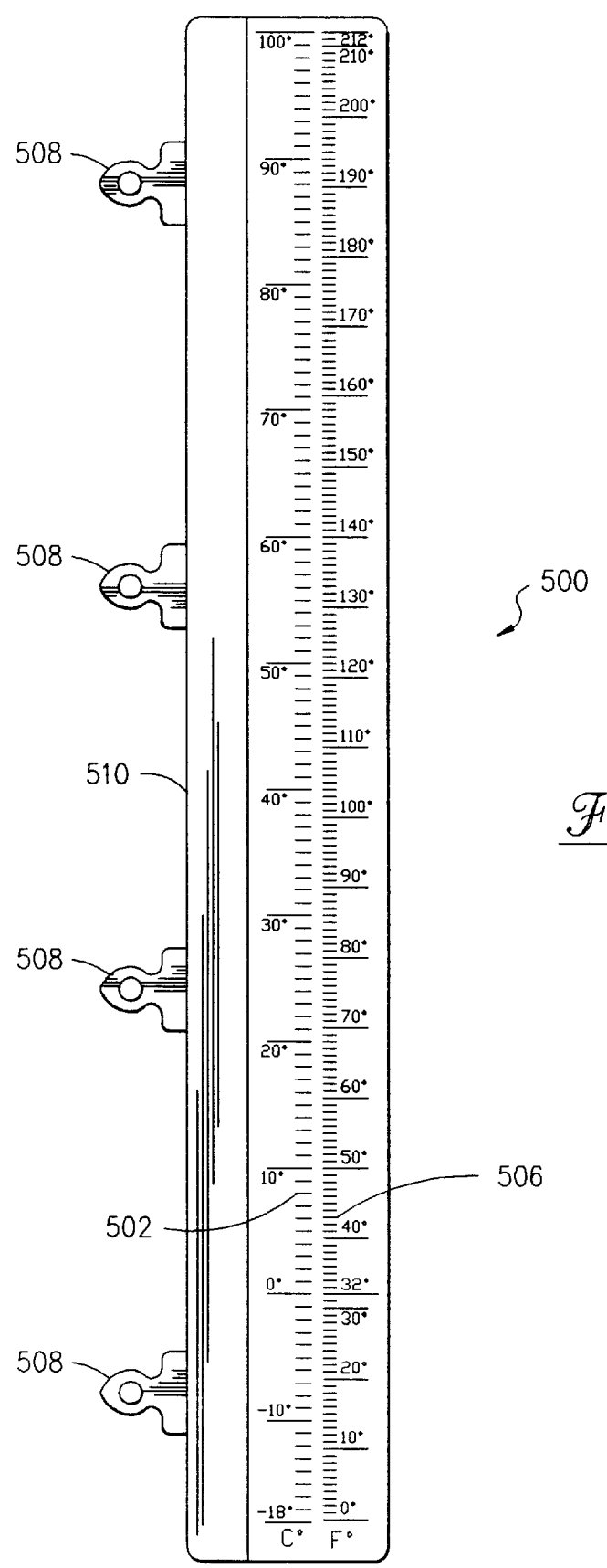
FIG. 14 is a plan view of the fourth alternative embodiment of the measurement device of the present invention.

FIG. 14 shows a fourth alternative embodiment 500 of the present invention. In this alternative embodiment, it can be seen that a first set of metric scale graduations 502 extends along a first edge 504 of the measurement device 500. A first set of British scale graduations 506 extends in parallel relationship to the first set of metric scale graduations 502. The first set of metric scale graduations 502 is a measurement of temperature in Centigrade. The first set of British scale graduations 506 is a measurement of temperature in Fahrenheit. As a result, the user of the measurement device 500 is able to determine the proper correlation between Centigrade measurement with Fahrenheit measurements. Insert elements 508 extend outwardly from the inch edge 510. The insert elements 508 can extend outwardly from the second edge 510 in any of the ways described herein previously.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A measurement device comprising:
   a generally flat member having a first edge extending therealong;
   a first set of British scale graduations formed along said first edge and extending inwardly of said first edge for a desired distance, said first set of British scale graduations having numerical designations arranged in a first orientation; and
   a first set of metric scale graduations formed adjacent said first set of British scale graduations and spaced in parallel relationship from said first edge by approximately said desired distance, said first set of metric scale graduations having numerical designations arranged in a similar orientation of said numerical designations of said first set of British scale graduations.

2. The device of claim 1, said generally flat member being a linear member, said first edge being a linear edge.

3. The device of claim 1, said first set of metric scale graduations extending in parallel relationship with said first set of British scale graduations and positioned behind said numerical designations of said first set of British scale graduations.

4. The device of claim 1, said generally flat member having a second edge extending in parallel relationship to said first edge, said generally flat member having a middle between said first and second edges, both of said numerical designations of said first set of British scale graduations and said numerical designations of said first set of metric scale graduations being on one side of said middle on said flat member.

5. The device of claim 1, said generally flat member having a second edge extending in parallel relationship to said first edge, said device further comprising:
   a second set of metric scale graduations formed along said second edge and extending inwardly of said second edge for a given distance, said second set of metric scale graduations having numerical designations arranged in a second orientation; an
   a second set of British scale graduations formed adjacent said second set of metric scale graduations and spaced in parallel relationship from said second edge by approximately said given distance, said second edge of British scale graduations having numerical designations arranged in a similar orientation as said numerical designations of said second set of metric scale graduations.

6. The device of claim 5, said second set of British scale graduations being in parallel relationship to said second set of metric scale graduations.

7. The device of claim 5, said numerical designations of said second set of British scale graduations being upside down relative to said numerical designations of said first set of British scale graduations.

8. The device of claim 7, said numerical designations of said second set of metric scale graduations being upside down relative to said numerical designations of said first set of metric scale graduations.

9. The device of claim 5, said generally flat member having a middle between said first and second edges, both of said numerical designations of said second set of metric scale graduations and said second set of British scale graduations being on an opposite side of said middle from said numerical designations of said first set of metric scale graduations and said first set of British scale graduations.

10. A measurement device comprising:
    a generally flat member having a first edge extending therealong;
    a first set of metric scale graduations formed along said first edge and extending inwardly of said first edge for a desired distance, said first set of metric scale graduations having numerical designations arranged in a first orientation; and
    a first set of British scale graduations formed adjacent said first set of metric scale graduations and spaced in parallel relationship from said first edge by approximately said desired distance, said first set of British scale graduations having numerical designations arranged in a similar orientation as said numerical designations of said first set of metric scale graduations.

11. The measurement device of claim 10, said numerical designations of said first set of British scale graduations having an indicator line extending from said numerical designations of said first set of British scale graduations transversely toward said first edge.

12. The measurement device of claim 10, further comprising:
    a second set of metric scale graduations formed adjacent said first set of British scale graduations opposite said first set of metric scale graduations, said second set of metric scale graduations having numerical designations of a similar orientation as said numerical designations of said first set of British scale graduations.

13. The measurement device of claim 12, said second set of metric scale graduations being a weight measurement scale.

14. The measurement device of claim 10, said first set of metric scale graduations and said first set of British scale graduations having a zero marker originating from an identical point along said first edge.

15. The measurement device of claim 10, said generally flat member being formed of a bottom panel resiliently mounted to a top panel, said first set of metric scale graduations and said first set of British scale graduations being formed on said top panel.

16. The measurement device of claim 15, said generally flat member having a second edge in generally parallel relationship to said first edge, said generally flat member further comprising:

a plurality of insert elements each having a bulbous portion at one edge and a hinge member of an opposite end; and a receptacle formed along said second edge between said top and bottom panels, said receptacle receiving said hinge member of said plurality of insert elements such that said bulbous portion extends outwardly of said second edge.

17. The measurement device of claim 16, said bulbous portion having a hole formed generally centrally therein.

18. The measurement device of claim 16, said hinge member comprising a longitudinal rod extending through said receptacle, each of said plurality of insert elements being connected to said longitudinal rod.

19. The measurement device of claim 10, further comprising:

a connector member extending along a second edge of said generally flat member opposite said first edge;

an intermediate connector having a first receptacle along one edge and a second receptacle along a second edge, said first receptacle detachably receiving said connector member; and an insert element having a bulbous portion at one end and a hinge member at an opposite end, said second receptacle detachably hingedly receiving said hinge member of said insert element.

20. The measurement device of claim 10, further comprising:

a plurality of insert elements hingedly connected to a second edge of said generally flat member opposite said first edge, each of said plurality of insert element having a bulbous portion opposite said second edge, said bulbous portion having a hole formed generally centrally therein.

* * * * *